US012553196B2

(12) United States Patent
Engels et al.

(10) Patent No.: US 12,553,196 B2
(45) Date of Patent: Feb. 17, 2026

(54) MEASURING PAVING THICKNESS DURING SLIP FORM PAVING

(71) Applicant: Wirtgen GmbH, Windhagen (DE)

(72) Inventors: Michael Engels, Montabaur (DE); Gunnar Ramseger, Borod (DE); Christoph Weigel, Sankt Augustin (DE)

(73) Assignee: Wirtgen GmbH, Windhagen (DE)

( * ) Notice: Subject to any disclaimer, the term of this patent is extended or adjusted under 35 U.S.C. 154(b) by 623 days.

(21) Appl. No.: 18/065,669

(22) Filed: Dec. 14, 2022

(65) Prior Publication Data

US 2024/0200288 A1 Jun. 20, 2024

(51) Int. Cl.
*E01C 23/01* (2006.01)
*E01C 19/00* (2006.01)
*E01C 19/48* (2006.01)
*G01S 15/08* (2006.01)

(52) U.S. Cl.
CPC ............ *E01C 23/01* (2013.01); *E01C 19/008* (2013.01); *E01C 19/4893* (2013.01); *G01S 15/08* (2013.01)

(58) Field of Classification Search
CPC .... E01C 23/01; E01C 19/008; E01C 19/4893; E01C 19/004; E01C 19/4853; E01C 19/4886; G01S 15/08
See application file for complete search history.

(56) References Cited

U.S. PATENT DOCUMENTS 3,605,579 A 9/1971 Heltzel
3,850,541 A 11/1974 Baillet et al.
4,798,495 A 1/1989 Laeuppi et al.
5,101,360 A 3/1992 Bennett
5,190,397 A 3/1993 Bengford et al.
(Continued)

FOREIGN PATENT DOCUMENTS

CH 498980 A 11/1970
DE 102005040326 B4 1/2023
(Continued)

OTHER PUBLICATIONS

Extended European Search Report for corresponding patent application No. EP 23215015, dated May 7, 2024, 6 pages (not prior art).
(Continued)

*Primary Examiner* — Abigail A Risic
(74) *Attorney, Agent, or Firm* — Lucian Wayne Beavers; Patterson Intellectual Property Law, PC

(57) ABSTRACT

A slip form paving machine includes a machine frame, a plurality of ground engaging wheels or tracks, and front and rear height adjustable lifting columns, the lifting columns being adjustable to adjust a height of the machine frame relative to a ground surface. A slip form mold is supported from the machine frame. A front height sensor configured to detect a distance of the machine frame from the ground surface ahead of the concrete slab and generate a front height signal. A rear height sensor is configured to detect a distance of the machine frame from an upper surface of the concrete slab and generate a rear height signal. A controller is configured to receive the front and rear height signals and to determine a thickness of the concrete slab based at least in part on the front and rear height signals.

20 Claims, 6 Drawing Sheets

(56) References Cited

U.S. PATENT DOCUMENTS

| | | | | |
|---|---|---|---|---|
| 5,209,602 | A | 5/1993 | Godbersen | |
| 5,309,407 | A * | 5/1994 | Sehr | G01B 17/00 367/96 |
| 5,405,212 | A | 4/1995 | Swisher et al. | |
| 5,556,226 | A * | 9/1996 | Hohmann, Jr. | E01C 19/006 404/101 |
| 5,568,992 | A | 10/1996 | Grembowicz et al. | |
| 5,588,776 | A | 12/1996 | Swisher, Jr. et al. | |
| 5,924,817 | A | 7/1999 | Godbersen | |
| 5,941,659 | A | 8/1999 | Godbersen | |
| 6,109,825 | A * | 8/2000 | Yon | E01C 19/008 404/84.2 |
| 6,176,643 | B1 | 1/2001 | Guntert et al. | |
| 6,390,726 | B1 | 5/2002 | Guntert et al. | |
| 6,390,727 | B1 | 5/2002 | Guntert et al. | |
| 6,597,037 | B1 | 7/2003 | Forbes et al. | |
| 6,655,869 | B1 | 12/2003 | Deeb et al. | |
| 6,916,070 | B2 * | 7/2005 | Sehr | E01C 19/006 299/1.5 |
| 7,037,035 | B2 | 5/2006 | Casters | |
| 7,136,522 | B2 | 11/2006 | Harrington et al. | |
| 7,172,363 | B2 * | 2/2007 | Olson | E01C 19/48 404/75 |
| 8,382,396 | B2 | 2/2013 | Francis et al. | |
| 8,613,566 | B2 | 12/2013 | Fritz et al. | |
| 8,794,868 | B2 | 8/2014 | Fritz | |
| 8,989,968 | B2 | 3/2015 | Fritz et al. | |
| 9,033,611 | B2 * | 5/2015 | Hanfland | G01B 21/18 404/84.1 |
| 9,039,322 | B2 | 5/2015 | Francis et al. | |
| 9,051,696 | B1 | 6/2015 | Coats et al. | |
| 9,096,977 | B2 | 8/2015 | Fritz et al. | |
| 9,359,726 | B2 | 6/2016 | Francis et al. | |
| 9,395,726 | B1 | 7/2016 | Rizzi et al. | |
| 9,404,228 | B1 | 8/2016 | Coats et al. | |
| 9,551,115 | B2 | 1/2017 | Engels et al. | |
| 10,132,046 | B2 | 11/2018 | Thieme et al. | |
| 10,253,461 | B2 | 4/2019 | Engels et al. | |
| 10,738,421 | B2 | 8/2020 | Guntert, Jr. et al. | |
| 10,982,396 | B2 * | 4/2021 | Fritz | E01C 19/4893 |
| 11,193,244 | B2 | 12/2021 | Guntert, Jr. et al. | |
| 11,560,675 | B2 * | 1/2023 | Buschmann | E01C 19/185 |
| 2001/0041094 | A1 | 11/2001 | Guntert, Jr. et al. | |
| 2006/0204334 | A1 | 9/2006 | Guntert et al. | |
| 2010/0150650 | A1 | 6/2010 | Buschmann et al. | |
| 2014/0133906 | A1 * | 5/2014 | Frelich | E01C 19/48 404/75 |
| 2015/0284918 | A1 * | 10/2015 | Fritz | E01C 23/127 299/1.5 |
| 2016/0115654 | A1 | 4/2016 | Pedersen et al. | |
| 2016/0177519 | A1 | 6/2016 | Fritz et al. | |
| 2022/0220676 | A1 * | 7/2022 | Shelstad | E01C 23/127 |

FOREIGN PATENT DOCUMENTS

| | | | |
|---|---|---|---|
| WO | 2008155113 | A1 | 12/2008 |
| WO | 2021052945 | A1 | 3/2021 |

OTHER PUBLICATIONS

D. Castro-Lacourute and L. S. Bryson, C. Maynard, R. L. Williams II and P. Bosscher, Concrete Paving Productivity Improvement Using a Multi-Task Autonomous Robot, 24th International Symposium on Automation & Robotics in Construction (ISARC 2007) Construction Automation Group, I.I.T. Madras, 7 pages.

Co-pending U.S. Appl. No. 17/555,568; not prior art.

Co-pending U.S. Appl. No. 18/065,668; not prior art.

Co-pending U.S. Appl. No. 18/065,673; not prior art.

* cited by examiner

MEASURING PAVING THICKNESS DURING SLIP FORM PAVING

FIELD OF THE DISCLOSURE

The present disclosure relates to a slip form paving machine and a method for controlling a slip form paving machine.

BACKGROUND

Errors in the production of a paved concrete structure can lead to the concrete being placed at a thickness different from the desired or planned thickness of the paved concrete structure. If the thickness of the concrete structure is too low the structure may not provide the necessary strength. If the thickness of the concrete structure is too high, there may be excessive costs to the contractor because too much concrete was used.

There is a need for apparatus and methods for measuring an actual thickness of a paved concrete structure formed by a slip form paving machine.

SUMMARY OF THE DISCLOSURE

In one embodiment a slip form paving machine includes a machine frame, a plurality of ground engaging wheels or tracks, and front and rear height adjustable lifting columns supporting the machine frame from the ground engaging wheels or tracks, the lifting columns being adjustable to adjust a height of the machine frame relative to a ground surface. A slip form mold is supported from the machine frame for molding a mass of concrete into a formed not yet hardened concrete slab as the paving machine moves forward in a paving direction. A front height sensor configured to detect a distance of the machine frame from the ground surface ahead of the concrete slab and generate a front height signal. A rear height sensor is configured to detect a distance of the machine frame from an upper surface of the concrete slab and generate a rear height signal. A controller is configured to receive the front and rear height signals and to determine a thickness of the concrete slab based at least in part on the front and rear height signals.

In a further embodiment the front height sensor may be arranged forward of the front lifting columns and the rear height sensor may be arranged rearward of the rear lifting columns.

In any of the above embodiments the front and rear height sensors may be ultrasonic sensors.

In any of the above embodiments each of the front and rear height sensors may include at least two discrete ultrasonic sensors spaced across a width of the machine frame.

In any of the above embodiments the front height sensor may include at least one front scanning laser sensor configured to scan the ground surface across a continuous portion of the width of the machine frame, and the rear height sensor may include at least one rear scanning laser sensor configured to scan the upper surface of the concrete slab across a continuous portion of the width of the machine frame.

In any of the above embodiments the controller may be configured to compare a front height signal corresponding to a given location on the ground surface to a later occurring rear height signal corresponding to substantially the same given location on the ground surface.

In any of the above embodiments the controller may be configured to correlate the front and rear height signals based upon the machine traveling a horizontal distance substantially equal to a horizontal spacing between the front and rear height sensors.

In any of the above embodiments the controller may be configured to store data corresponding to the height signals in a computer memory and correlate the data to a location of the machine upon the ground surface.

In any of the above embodiments the machine may include a three-dimensional grade control system based upon a position of the machine in a reference system external to the machine, and the controller may be configured to correlate the data to the position of the machine in the reference system external to the machine.

In any of the above embodiments the three-dimensional grade control system may include a satellite based system.

In any of the above embodiments the three-dimensional grade control system may include a Total station based system.

In any of the above embodiments the controller may be configured to determine a total volume of the concrete slab formed during a selected time interval.

In any of the above embodiments the controller may be configured to send command signals to cause the lifting columns to automatically adjust the height of the machine frame relative to the ground surface and thereby control the thickness of the concrete slab based at least in part on a comparison of the determined thickness of the concrete slab to a desired thickness of the concrete slab.

A method of operating a slip form paving machine constructed in accordance with any of the above embodiments may include steps of: detecting a distance relative to the machine frame from the ground surface with a front height sensor ahead of the concrete slab and generating a front height signal; detecting a distance relative to the machine frame from an upper surface of the concrete slab with a rear height sensor and generating a rear height signal; and determining with a controller a thickness of the concrete slab based at least in part on the front and rear height signals.

In the above method the determining may include comparing a front height signal corresponding to a given location on the ground surface to a later occurring rear height signal corresponding to substantially the same given location on the ground surface.

In any of the above methods the determining may include correlating the front and rear height signals based upon the machine traveling a horizontal distance substantially equal to a horizontal spacing between the front and rear height sensors.

Any of the above methods may further include storing data corresponding to the height signals in a computer memory and correlating the data to a location of the machine upon the ground surface.

Any of the above methods may further include automatically determining with the controller a total volume of the concrete slab formed during a paving operation.

Any of the above methods may further include comparing with the controller the determined thickness of the concrete slab to a desired thickness of the concrete slab and sending command signals from the controller to cause the lifting columns to automatically adjust the height of the machine frame relative to the ground surface and thereby control the thickness of the concrete slab based at least in part on the comparing.

Numerous objects, features and advantages of the present invention will be readily apparent to those skilled in the art upon a review of following description in conjunction with the accompanying drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
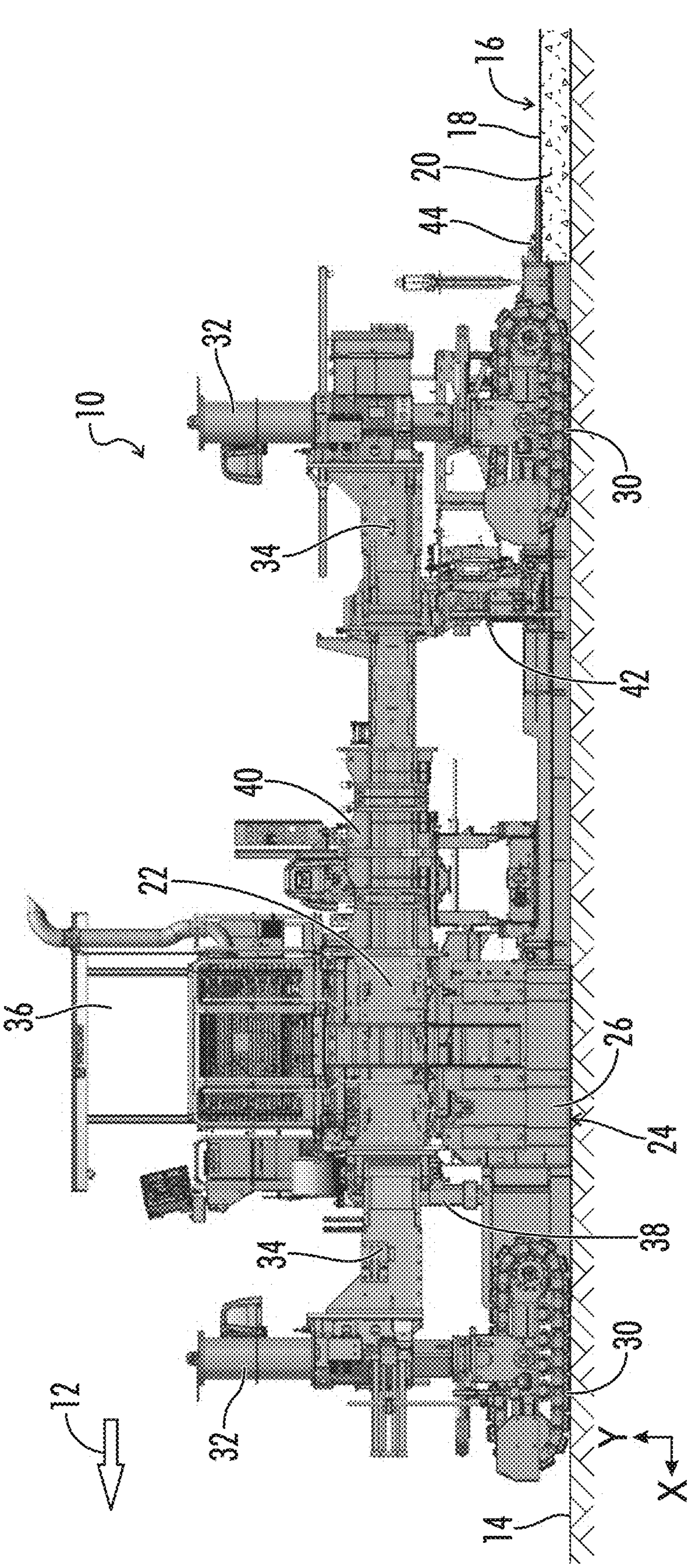
FIG. 1 is a side elevation view of a slip form paver.

Referring now to the drawings and particularly to FIG. 1 a slip form paver machine is shown and generally designated by the number 10. The machine 10 is configured to move in a paving direction 12 across a ground surface 14 for spreading, leveling and finishing concrete into a finished concrete structure 16 having a generally upwardly exposed concrete surface 18 and terminating in lateral concrete sides such as 20.

The slip form paver machine 10 includes a main frame 22 and a slip form paver mold 24 supported from the main frame 22. Left and right side form assemblies 26 are connected to the slip form paver mold 24 to close the slip form paver mold 24 on the left and right sides to form the lateral concrete sides such as 20 of the finished concrete structure 16. The slip form paver machine 10 shown in FIG. 1 is an inset type slip form paver apparatus.

The main frame 22 is supported from the ground surface by a plurality of ground engaging units such as 30, which in the illustrated embodiment are tracked ground engaging units 30. Wheeled ground engaging units may also be used. Each of the ground engaging units 30 is connected to the main frame 22 by a lifting column such as 32 which is attached to a swing arm such as 34. An operator's station 36 is located on the main frame 22. A plow or spreader device 38 is supported from the main frame 22 ahead of the slip form paver mold 24. A spreading auger may be used instead of the plow 38. Behind the slip form paver mold 24 a dowel bar inserter apparatus 40 may be provided. Behind the dowel bar inserter apparatus 40 an oscillating beam 42 and/or a super smoother apparatus 44 may be provided. If no dowel bar inserter apparatus 40 is used the oscillating beam 42 and/or the super smoother apparatus 44 may be provided behind the slip form paver mold 24.

Figure 2:
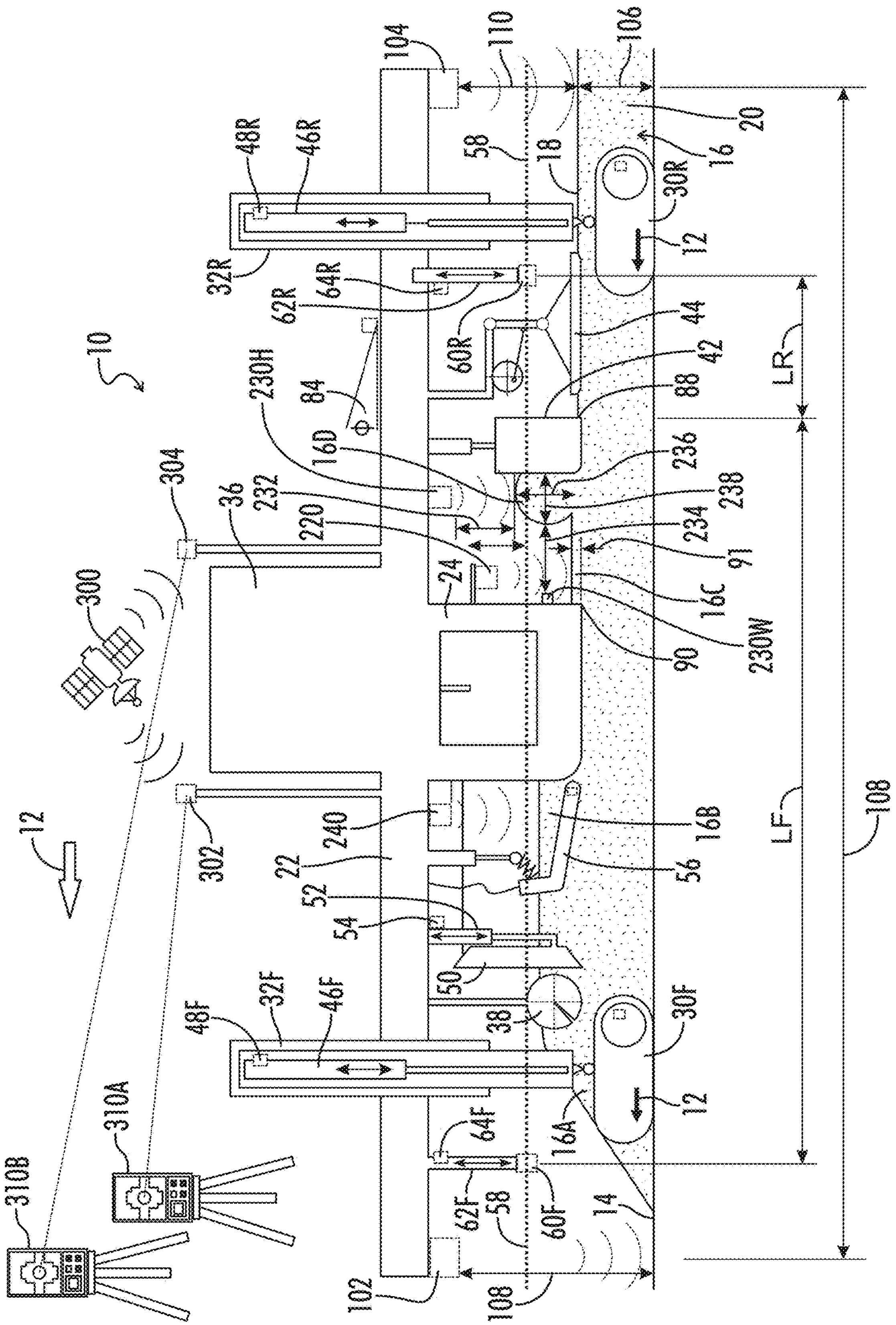
FIG. 2 is a schematic side elevation view of the slip form paver of FIG. 1, but not including a dowel bar inserter.

It will be appreciated that many slip form pavers do not include the dowel bar inserter apparatus 40. The further schematic illustration of FIG. 2 shows the slip form paver machine 10 without the dowel bar inserter apparatus 40. Also it will be appreciated that some slip form pavers do not include the oscillating beam 42.

FIG. 2 schematically shows the slip form paving machine 10 including the oscillating beam 42 but not including a dowel bar inserter 40. It will be understood that the dowel bar inserter 40 could be placed between the slip form mold 24 and the oscillating beam 42.

In FIG. 2 the lifting columns 32 are designated as 32F and 32R for the front and rear lifting columns, respectively. The tracks 30 are designated as 30F and 30R for the front and rear tracks, respectively. It will be understood that there are two front lifting columns 32F on left and right sides of the machine 10, supporting the machine frame 22 from two front tracks 30F. Similarly, there are two rear lifting columns 32R supporting the machine frame 22 from two rear tracks 30R. In both FIGS. 1 and 2 the slip form paving machine 10 is illustrated as a four-track machine having front and rear tracked ground engaging units 30 on each of the left and right sides of the machine. It will be understood that the various features disclosed herein are equally applicable to a two-track paving machine, such as for example the Wirtgen Model SP 62*i*, having one long crawler track on each of the left and right sides of the machine frame, with a front and a rear lifting column on each side of the machine frame supporting the machine frame from each of the two tracks.

Each of the lifting columns is constructed as a telescoping member and may include a hydraulic smart cylinder actuator such as 46F and 46R seen in FIG. 2. Extension and retraction of the actuators 46F and/or 46R causes extension and retraction of the lifting columns 32F and 32R and can raise or lower the machine frame 22 relative to the ground surface 14 and/or can adjust a longitudinal and/or transverse inclination of the machine frame 22 relative to the ground surface 14. Each of the hydraulic smart cylinders may include an integrated extension sensor such as 48F and 48R to allow precise monitoring and control of the extension of the lifting columns 32. Optionally the lifting columns may include conventional hydraulic cylinders and separate associated extension sensors.

The plow or spreader device 38 identified in FIG. 1 is shown schematically in FIG. 2 as an auger type spreader device 38.

Behind the auger type spreader device 38 is a height adjustable concrete supply gate 50. The gate 50 is supported from the machine frame 22 by one or more gate actuators 52 for adjusting a height of the gate 50 relative to the machine frame 22. The gate actuators 52 may also be constructed as hydraulic smart cylinders having integrated extension sensors 54 to allow precise monitoring and control of the extension of the height of the gate 50. Optionally the gate actuators 52 may include conventional hydraulic cylinders and may have separate associated extension sensors.

Between the gate 50 and the slip form mold 24 are a plurality of vibrators 56 which are configured to be submerged in the concrete mass from which the slab 16 is formed to aid in compacting the concrete as the slip form mold 24 moves over the concrete mass.

In the paving process a mass of concrete material 16A is dumped on the ground surface 14 ahead of the paving machine 10. This is typically done with a series of dump trucks (not shown) dumping their loads of wet concrete onto the ground surface, so the supply of concrete material 16A occurs in a series of sequential dumps of material. Alternatively, the concrete mass may be supplied by a side feeder, a shuttle buggy, a placer-spreader or other known concrete supply means. The material 16A is spread transversely across the width of the paving machine 10 by the spreader device 38. The height of the concrete supply gate 50 is adjusted to control the amount of concrete material 16B directly in front of the slip form mold 24. With the aid of the vibrators 56 the concrete material is consolidated and semi-liquified and the slip form mold 24 moves across the concrete material 16B to form it into the concrete slab 16. Immediately behind the slip form mold 24 there may be some swelling in height of the newly formed slab in the area 16C. The swelling of the concrete slab causes an increase in the height of the slab as represented in FIG. 2 by the dimension 91 which is the increase in height of the slab above the bottom edge 90 of the mold 24. Immediately ahead of the oscillating beam 42 a roll 16D of concrete material may form.

The oscillating beam 42 is supported from the machine frame 22 behind the slip form mold 24 for engaging and oscillating transversely to the paving direction 12 upon the upper surface 18 of the formed not yet hardened concrete slab 16 to smooth the upper surface 18. The upper surface 18 may be further smoothed by the action of the super smoother 44 which is a large automated smoothing trowel which moves transversely across the width of the slab 16 while reciprocating forward and rearward.

The direction of the paving machine 10 and the height of the formed concrete slab 16 may be controlled with a grade control system. One such grade control system is a stringline type grade control system in which a stringline 58 is constructed adjacent the location of the planned concrete slab. Such a stringline 58 may be constructed in advance of the paving operation by a surveyor who places the stringline at a known geographic location and at a known elevation. The machine 10 may then use the stringline 58 as a physical reference to guide both the path of the machine 10 and to control the height of the machine 10 relative to the ground surface 14 so as to control the height of the upper surface 18 of the formed concrete slab 16.

Although the paving machine 10 is primarily described in the present disclosure in the context of a stringline type grade control system, it will be understood that some aspects of the improved paving machine 10 disclosed herein may be used with other types of grade control systems such as a satellite based grade control system (GPS or GNSS) or a Total Station type grade control system or a hybrid combination of a satellite based grade control system and a Total Station type grade control system. In FIG. 2 a satellite based grade control system is schematically indicated by a satellite 300 and by receivers 302 and 304 on the machine 10 which may be satellite signal receivers 302 and 304. Also, in FIG. 2 two Total Station laser transmitters are schematically represented as 310A and 310B, and in that case the receivers 302 and 304 may be Total Station reflectors/receivers of a known type.

The machine 10 may include front and rear stringline sensors 60F and 60R. Although the machine 10 may have front and rear stringline sensors 60F and 60R on each side of the machine (left and right), it will be understood that on some occasions a stringline 58 may only be constructed for one side of the machine 10 in which case the elevation of the opposite side of the machine 10 may be controlled via a cross-slope sensor which detects the cross-slope of the machine frame 22 relative to gravity.

Figure 3:
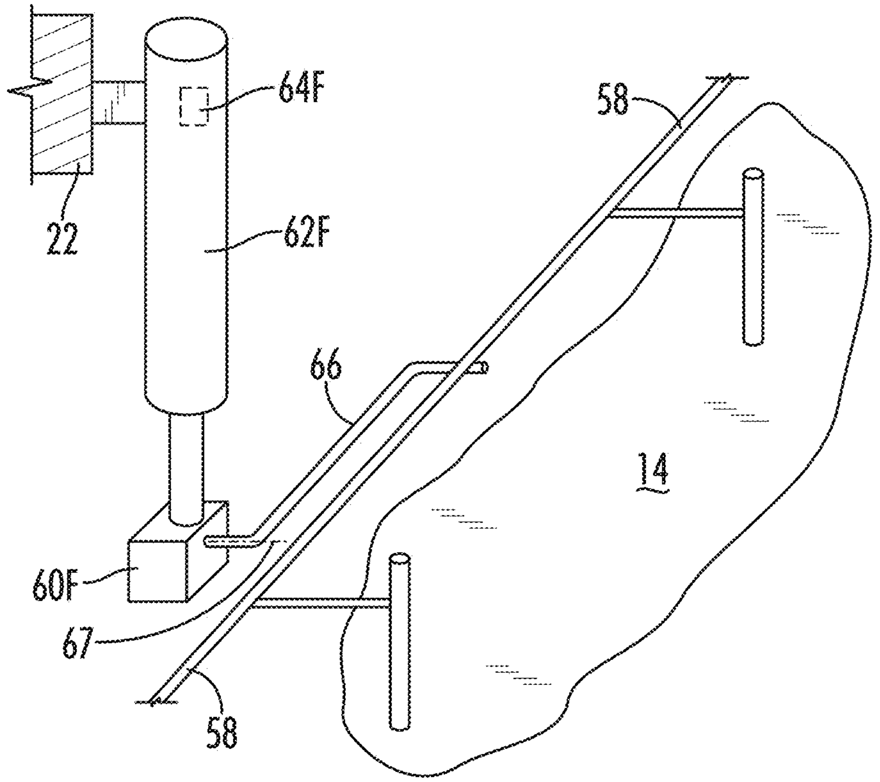
FIG. 3 is a schematic representation of the front sensor actuator in the form of a hydraulic smart cylinder, and those portions of the front stringline sensor engaged with a stringline.

Each of the front and rear stringline sensors 60F and 60R may be constructed in a known manner as schematically shown in FIG. 3. The front and rear stringline sensors 60F and 60R may be supported from the machine frame 22 by front and rear sensor actuators 62F and 62R, respectively. The actuators 62F and 62R are configured to adjust a vertical position of the front and rear stringline sensors 60F and 60R, respectively, relative to the machine frame 22.

A front sensor actuator position sensor 64F may be associated with the front sensor actuator 62F and configured to generate a position signal representative of the vertical position of the front stringline sensor 60F relative to the machine frame 22. A rear sensor actuator position sensor 64R may be associated with the rear sensor actuator 62R and configured to generate a position signal representative of the vertical position of the rear stringline sensor 60R relative to the machine frame 22.

In one embodiment the front and rear sensor actuators 62F and 62R may be front and rear hydraulic smart cylinders 62F and 62R and the front and rear sensor actuator position sensors 64F and 64R may be integrated in the front and rear hydraulic smart cylinders 62F and 62R, respectively. Optionally the actuators 62F and 62R may include conventional hydraulic cylinders and may have separate associated extension sensors.

In another embodiment the front and rear sensor actuators 62F and 62R may be front and rear rotary spindles powered by rotary motors and the front and rear sensor actuator position sensors 64F and 64R may be rotational position sensors.

FIG. 3 schematically shows the front stringline sensor 60F supported by front sensor actuator 62F which is shown as a hydraulic smart cylinder 62F. It will be understood that the other stringline sensors and associated sensor actuators may be similarly constructed. The sensor 60F includes a wand 66 which engages the stringline 58. The sensor wand 66 may be biased to ride along the underside of the stringline 58. Any change in height of the machine frame 22 relative to the stringline 58 will cause a rotation of the wand 66 about sensor axis 67 and will create a sensor signal which can be used as a basis for adjustment of the position of the associated lifting column actuator 46F to maintain a desired elevation of the machine frame 22 relative to the stringline 58. The sensor 60F will typically be initially set up with the wand 66 in a “zero” position with the machine frame 22 at the desired height relative to the stringline 58. The “zero” position is preferably a horizontal position of the wand 66. Then if the wand 66 is rotated up or down a corresponding adjustment can be made in the lifting column position to maintain a desired elevation of the machine frame 22 and thus of the resulting concrete slab 16 relative to the stringline 58. If it is desired to adjust a height of the machine frame 22 and the concrete slab 16 relative to the stringline 58 this may be done by adjusting the vertical position of the sensor 60F relative to the machine frame 22 using the front sensor actuator 62F. Because the sensor actuator 62F is constructed as a hydraulic smart cylinder having an integrated extension sensor 64F, this allows precise monitoring and control of the extension of the height of the front stringline sensor 60F.

Figure 4:
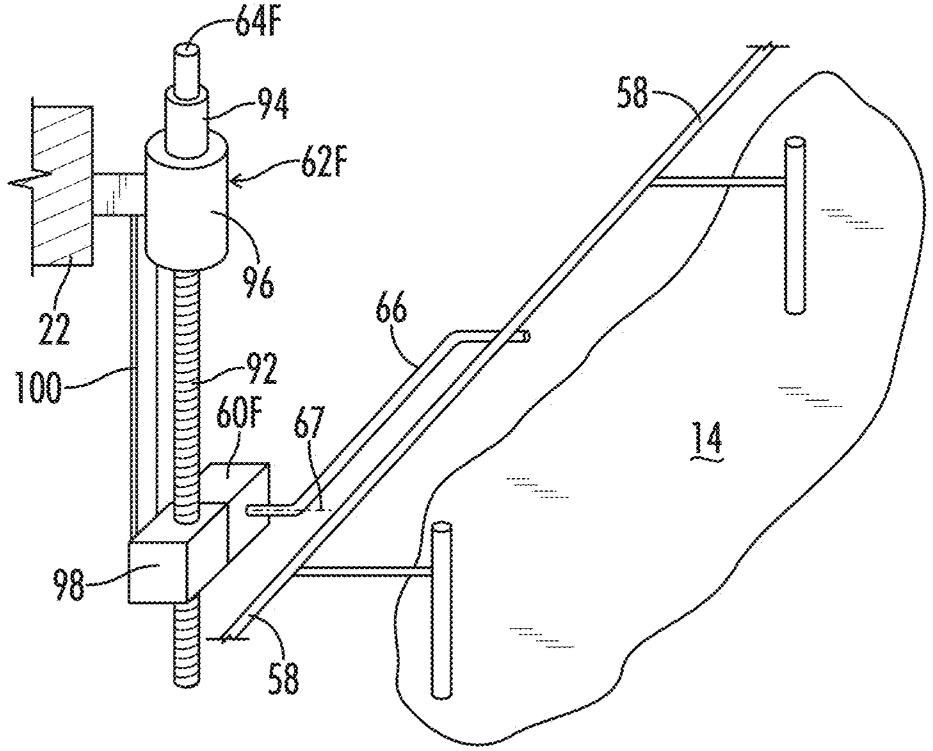
FIG. 4 is a schematic representation of the front sensor actuator in the form of a hydraulically powered rotary spindle, and those portions of the front stringline sensor engaged with a stringline.

FIG. 4 is a schematic illustration similar to FIG. 3 but showing the front sensor actuator 62F as a rotary spindle. The front sensor actuator position sensor 64F is shown as a rotary counter or angle sensor which counts the rotations of the spindle corresponding to a change in vertical position of the front stringline sensor 60F. The sensor actuator 62F of FIG. 4 includes a spindle 92 driven by a rotary motor 94, which may be either a hydraulic motor or an electric motor 94. The spindle 92 is supported by a spindle housing 96 supported from machine frame 22. A nut 98 is threadedly received about spindle 92 and is vertically movable relative to machine frame 22 as guided by guide 100. The front stringline sensor 60F is mounted on nut 98. When the spindle 92 is rotated by motor 94 the nut 98 and attached sensor 60F is moved vertically up or down depending on the direction of rotation of the spindle 92. The rotary counter 64F counts the rotations of the spindle 92 and generates a signal corresponding to the movement of the front stringline sensor 60F.

As will be understood by those skilled in the art, the stringline sensors 60F and 60R may be hydraulic sensors such that movement of wand 66 moves a hydraulic valve and directs flow of hydraulic fluid to the associated lifting column actuator 46. Or the stringline sensors 60F and 60R may be electronic sensors that generate electrical signals to be used by a controller to generate command signals to various electromechanical actuators.

Hydraulic "Smart" Cylinders

As previously noted, the many of the actuators disclosed herein may be "smart" hydraulic cylinders having integral extension sensors associated therewith.

Figure 5:
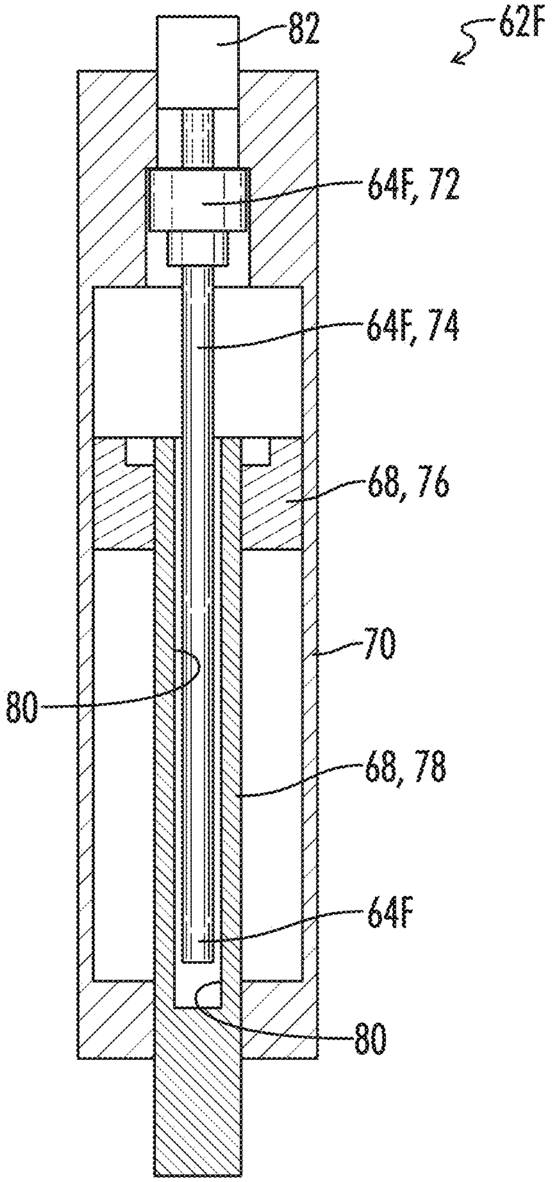
FIG. 5 is a schematic representation of a "smart" hydraulic cylinder.

A representative construction of such a "smart" hydraulic cylinder is shown in FIG. 5, and the details of a "smart" hydraulic sensor actuator 62F will be described by way of example. FIG. 5 may also be representative of the internal construction of any of the other actuators herein described when those actuators are implemented as "smart" cylinders. In the illustrated embodiment, the actuator 62F includes an integrated sensor 64F configured to provide a signal corresponding to an extension of a piston portion 68 relative to a cylinder member 70 of the actuator 62F.

The sensor 64F includes a position sensor electronics housing 72 and a position sensor coil element 74. The piston portion 68 of actuator 62F includes a piston 76 and a rod 78. The piston 76 and rod 78 have a bore 80 defined therein, within which is received the position sensor coil element 74.

The actuator 62F is constructed such that a signal is provided at connector 82 representative of the position of the piston 76 relative to the position sensor coil element 74.

Such smart cylinders may operate on several different physical principles. Examples of such smart cylinders include but are not limited to magneto-strictive sensing, magneto-resistive sensing, resistive (potentiometric) sensing, Hall effect sensing, sensing using linear variable differential transformers, and sensing using linear variable inductance transducers.

Control System

Figure 6:
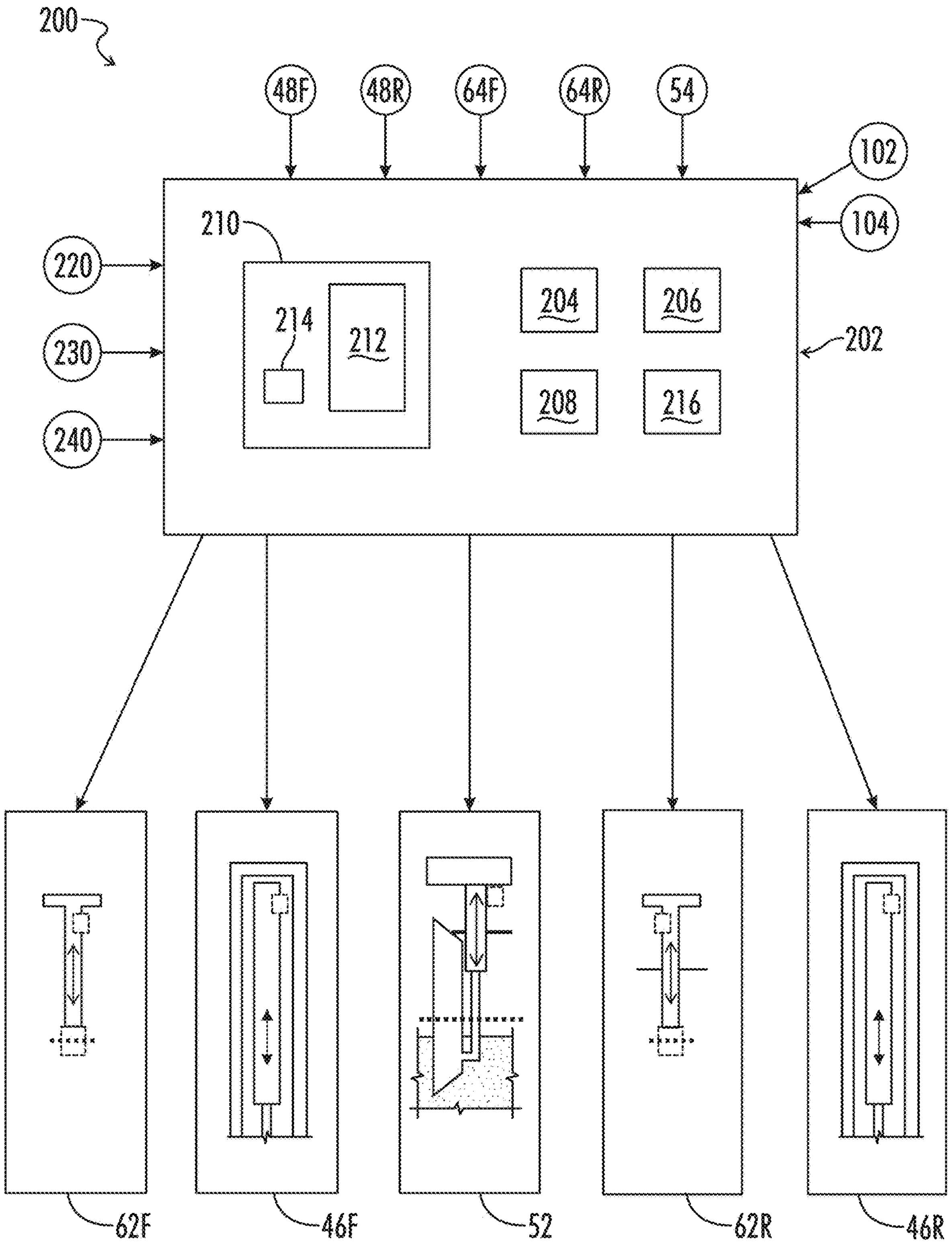
FIG. 6 is a schematic drawing of the control system.

As schematically illustrated in FIG. 6, the machine 10 includes a control system 200 including a controller 202. The controller 202 may be part of the machine control system of the slip form paver 10, or it may be a separate control module. The controller 202 may for example be mounted in a control panel located at the operator's station 36. The controller 202 is configured to receive input signals from the various sensors. The signals transmitted from the various sensors to the controller 202 are schematically indicated in FIG. 6 by lines connecting the sensors to the controller with an arrowhead indicating the flow of the signal from the sensor to the controller 202.

For example, extension signals from the extension sensors 48F and 48R of the lifting column actuator cylinders 46F and 46R will be received by controller 202 so that the controller can monitor and control the extension of the lifting columns 32F and 32R. Extension signals from the sensor actuator position sensors 64F and 64R will be received by the controller 202 so that the controller 202 can monitor and control the vertical positions of the front and rear stringline sensors 60F and 60R. Extension signals from the extension sensor 54 of gate actuator 52 will be received by controller 202 so that the controller can monitor and control the extension of the gate actuator 52 and thus the height of gate 50.

Similarly, the controller 202 will generate control signals for controlling the operation of the various actuators discussed above, which control signals are indicated schematically in FIG. 6 by lines connecting the controller 202 to graphic depictions of the various actuators with the arrow indicating the flow of the command signal from the controller 202 to the respective actuators. It will be understood that for control of a hydraulic cylinder type actuator the controller 202 will send an electrical signal to an electro/mechanical control valve (not shown) which controls flow of hydraulic fluid to and from the hydraulic cylinder.

In FIG. 6, for ease of illustration, only the actuators for the left hand side of the machine 10 are shown, it being understood that the actuators for the right hand side of the machine 10 may be identical to those of the left hand side. Thus FIG. 6 schematically shows the adjustable left front sensor actuator 62F, the left front lifting column actuator 46F, a left side gate actuator 52, the left rear sensor actuator 62R and the left rear lifting column actuator 46R.

It will be understood that when adjusting the longitudinal inclination 84 typically both the left and right front sensor actuators will be adjusted in an identical manner and both the left and right rear sensor actuators will be adjusted in an identical manner. But it will also be understood that if it is desired to create a cross-slope of the machine frame 22 the left and right sensor actuators may be adjusted differently from each other, and the front and rear sensor actuators of one and the same side may be adjusted in an identical manner.

Controller 202 includes or may be associated with a processor 204, a computer readable medium 206, a data base 208 and an input/output module or control panel 210 having a display 212. An input/output device 214, such as a keyboard, joystick or other user interface, is provided so that the human operator may input instructions to the controller. It is understood that the controller 202 described herein may be a single controller having all of the described functionality, or it may include multiple controllers wherein the described functionality is distributed among the multiple controllers.

Various operations, steps or algorithms as described in connection with the controller 202 can be embodied directly in hardware, in a computer program product 216 such as a software module executed by the processor 204, or in a combination of the two. The computer program product 216 can reside in RAM memory, flash memory, ROM memory, EPROM memory, EEPROM memory, registers, hard disk, a removable disk, or any other form of computer-readable medium 206 known in the art. An exemplary computer-readable medium 206 can be coupled to the processor 204 such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The data storage in computer readable medium 206 and/or database 208 may in certain embodiments include a database service, cloud databases, or the like. In various embodiments, the computing network may comprise a cloud server, and may in some implementations be part of a cloud application wherein various functions as disclosed herein are distributed in nature between the computing network and other distributed computing devices. Any or all of the distributed computing devices may be implemented as at least one of an onboard vehicle controller, a server device, a desktop computer, a laptop computer, a smart phone, or any other electronic device capable of executing instructions. A processor (such as a microprocessor) of the devices may be a generic hardware processor, a special-purpose hardware processor, or a combination thereof.

Particularly the controller 202 may be programmed to receive extension signals from each of the extension sensors of the various hydraulic smart cylinders and to send control signals to control the extension of those hydraulic smart cylinders at least in part in response to the respective extension signals.

Control of Longitudinal Inclination with Smart Stringline Sensor Actuators

As is further described below with regard to various operational modes of the paving machine 10 that may be implemented by the control system 200, it is sometimes desirable to adjust the longitudinal inclination of the paving machine 10 to affect the flow of concrete material at locations 16A, 16B, 16C, 16D as the paving machine 10 moves over the concrete material to form the concrete slab 16.

The controller 202 will implement desired changes in longitudinal inclination of the machine frame 22 relative to ground surface 14 by sending command signals to the front and rear sensor actuators 62F and 62R to cause an adjustment in the longitudinal inclination of the machine frame 22. The longitudinal inclination of machine frame 22 is schematically represented in FIG. 2 as the angle 84. The angle 84 may be determined by the controller 202 based for example upon measured extension of the front and rear lifting columns which will establish the longitudinal inclination relative to a reference such as the ground surface or the string line reference.

This adjustment of the longitudinal inclination may be effected as follows. Adjustment of the vertical positions of the front and/or rear stringline sensors 60F and 60R by the front and rear sensor actuators 62F and 62R will in turn generate control signals from the front and/or rear stringline sensors 60F and 60R based upon which the grade control system will cause adjustment in the extension of the corresponding lifting column actuators 46F and 46R to bring the wand 66 of each of the stringline sensors 60F and 60R back to its "zero" position. Thus, for example, if it is desired to raise the front of the machine frame 22 relative to the rear of the machine frame 22 the controller 202 may send a command signal to the front sensor actuator 62F to extend actuator 62F. This will cause the wand 66 of sensor 60F to deflect upward as it maintains contact with stringline 58, thus generating a control signal which will cause the front lifting column actuator 46F to extend until the wand 66 of the front stringline sensor 60F deflects back to its "zero" position. As is further explained below the controller 202 may determine, based upon the geometry of the machine 10, the appropriate adjustments in vertical position of the stringline sensors 60F and 60R to cause any desired change in longitudinal inclination 84 of the machine frame 22.

For example, in addition to adjusting the angle of inclination 84 it may be desired to control a predetermined rotational axis about which the machine frame rotates as the longitudinal inclination changes so that a height of the upper surface 18 of the formed but not yet hardened concrete slab 16 at and behind the predetermined rotational axis is not changed. This can be accomplished by adjusting both the front and rear lifting columns. Preferably such control of both the front and rear lifting columns is done so that the adjustment of the front and rear lifting columns occurs simultaneously. But it is also possible to adjust both the front and rear lifting columns sequentially or in alternating steps so long as the adjustment of both the front and rear lifting columns is accomplished within a sufficiently short interval of time such that there is no significant discontinuity created in the paved surface 18.

For example, in the embodiment shown in FIG. 2 including the oscillating beam 42 following the slip form mold 24 it is the back edge of the bottom of the oscillating beam 42 which determines the height of the upper surface 18 of slab 16. Accordingly, when adjusting the longitudinal inclination 84 of the machine as shown in FIG. 2, the predetermined rotational axis would be axis 88 extending perpendicular to the plane of the drawing of FIG. 2 along the back edge of the bottom of the oscillating beam 42. On the other hand, if the oscillating beam 42 were omitted from the paving machine 10, then it would be the back edge of the slip form mold 24 which determines the height of the upper surface 18 of slab 16, so in that case when adjusting the longitudinal inclination 84 the predetermined rotational axis would be the axis 90 extending perpendicular to the plane of the drawing of FIG. 2 along the back edge of the bottom of the slip form mold 24.

As noted, the controller 202 may be configured via appropriate programming to determine the appropriate adjustments in vertical position of the front and rear stringline sensors 60F and 60R to achieve a desired change in longitudinal inclination angle 84 and to cause that change to occur by rotation of the machine frame about a predetermined axis of rotation such as the axis 88 at the back edge of the oscillating beam 42 or the axis 90 at the back edge of the slip form mold 24. This may be done by configuring the controller 202 to adjust the longitudinal inclination of the machine frame by adjusting a ratio of a vertical adjustment of the front stringline sensor 60F to a vertical adjustment of the rear stringline sensor 60R as a function of a ratio of a horizontal distance of the front stringline sensor 60F from the rotational axis to a horizontal distance of the rear stringline sensor 60F from the rotational axis.

For example, as shown in FIG. 2 the horizontal distance of the front stringline sensor 60F from the rotational axis 88 is shown as LF, and the horizontal distance of the rear stringline sensor 60F from the rotational axis 88 is shown as LR. For the relatively small angles of inclination involved in the operation of the paving machine 10 the ratio of the vertical adjustment of front sensor 60F to that of the rear sensor 60R is substantially the same as the ratio LF/LR. Also, the associated ratio of the vertical adjustment of the front lifting column actuator 46F to the rear lifting column actuator 46R is similarly determinable by knowing the respective horizontal distances of the lifting columns from the rotational axis. Thus, by knowing the distances LF and LR, the controller can determine the desired changes in vertical position of the stringline sensors 60F and 60R to accomplish a desired change in extension/retraction of the lifting column actuators 46F and 46R to achieve the desired change in longitudinal inclination 84 about the predetermined rotational axis 88. It is noted that the changes in vertical position of the stringline sensors 60F and 60R may be in opposite directions, i.e. one up and one down, to accomplish the desired rotation about the predetermined rotational axis 88.

A method of controlling the slip form paving machine 10 described above including the front and rear stringline sensors 60F and 60R and the front and rear sensor actuators 62F and 62R may include steps of:

(a) determining with the controller 202 a desired change in the longitudinal inclination 84 of the machine frame 22; and (b) sending a command signal from the controller 202 to one or more of the sensor actuators 62F and 62R and thereby adjusting the vertical position of one or more of the stringline sensors 60F and 60R to effect the desired change in longitudinal inclination.

The method may further include receiving the position signals from the front and rear sensor actuator positions sensors 64F and 64R with the controller 202 and generating the command signal at least in part based on the position signals.

Step (b) may further include adjusting the longitudinal inclination 84 of the machine frame 22 by adjusting both the front and rear lifting columns 32F and 32R thereby tilting the machine frame 22 about a predetermined rotational axis, e.g. 88 or 90, so that a height of the upper surface 18 of the formed not yet hardened concrete slab 16 behind the rotational axis is not changed.

And step (b) may further include adjusting the longitudinal inclination 84 of the machine frame 22 by adjusting both the front and rear lifting columns 32F and 32R simultaneously.

And step (b) may further include adjusting the longitudinal inclination 84 of the machine frame 22 by adjusting a ratio of a vertical adjustment of the front stringline sensor to a vertical adjustment of the rear stringline sensor as a function of a ratio of a horizontal distance LF of the front stringline sensor 60F from the rotational axis to a horizontal distance LR of the rear stringline sensor 60R from the rotational axis.

And if the machine further includes at least one machine operating parameter sensor, e.g. the swelling sensor 220 discussed below, configured to sense at least one machine operating parameter and to generate sensor signals corresponding to the at least one machine operating parameter, the method may further include receiving the sensor signals with the controller and generating the command signal based at least in part on the sensor signals from the at least one machine operating parameter sensor.

Swelling Sensors

One phenomenon which must be dealt with when operating a slip form paver 10 is that of swelling of the concrete layer 16 in the area 16C behind the slip form paver mold 24. In an embodiment of the machine 10 a swelling sensor 220 may be provided to detect a swelling of the formed not yet hardened concrete slab 16 relative to the machine frame 22 behind the slip form mold 24. The swelling sensor 220 generates a swelling signal which is received by the controller 202. The controller 202, in response to the swelling signal, may generate a command signal to one or more of the actuators discussed above to adjust at least one operating parameter of the paving machine 10. As is further described below the operating parameters may include the longitudinal inclination angle 84, the travel speed or advance speed of the paving machine 10 during paving, the speed or frequency of vibration of vibrators 56 and the height of the concrete gate 50.

In one embodiment as seen in FIG. 2 the swelling sensor 220 may be a contactless distance sensor such as an ultrasonic sensor or a laser sensor supported from the slip form paver mold 24 or from the machine frame 22 and directed toward the surface 18 of the concrete slab 16 behind of the slip form paver mold 24 to measure a vertical distance from a fixed location on the mold 24 or on the machine frame 22 to the surface 18.

Figure 7A:
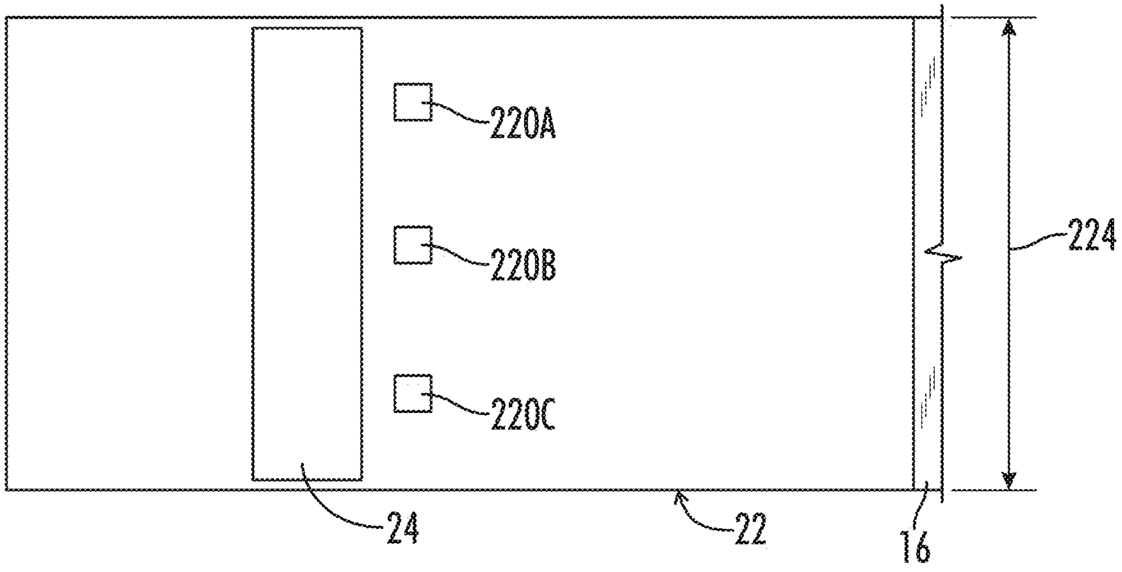
FIG. 7A is a schematic plan view of a swelling sensor in the form of three discrete ultrasonic sensors spread across the width of the machine.

Although only a single swelling sensor 220 is shown in the schematic illustration, it will be understood that multiple swelling sensors 220 may be placed across the width of the slip form paver machine 10. As schematically shown in FIG. 7A, preferably the swelling sensor 220 includes at least two, and more preferably at least three, height sensors 220A, 220B, 220C spaced across a width 224 of the machine frame 22 and/or of the slab 16. The concrete swelling may not be uniform across the width of the concrete slab and thus it may be desirable to make variable adjustments in operating parameters across the width of the concrete slab. Also, it will be understood that in rare cases the "swelling" of the concrete slab may even be negative, that is the concrete slab may shrink, and that also can be accommodated by the systems described above.

Figure 7B:
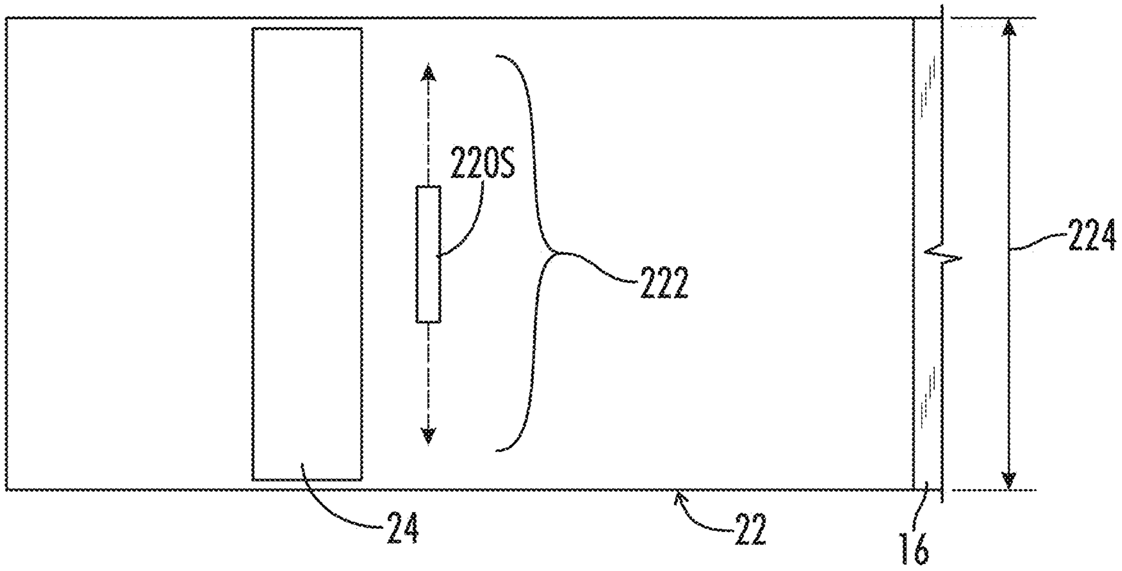
FIG. 7B is a schematic plan view of a swelling sensor in the form of a centrally located laser scanner scanning across a continuous portion of the width of the machine.

In another embodiment as schematically indicated in the plan view of FIG. 7B, the swelling sensor 220 may include at least one scanning sensor 220S, for example a laser scanner, configured to scan the height of the formed not yet hardened concrete slab 16 behind the slip form mold 24 across a continuous portion 222 of the width 224 of the machine frame 22. A variety of sensor technologies may be used for the swelling sensor 220 and the other sensors disclosed herein. The improvements as disclosed herein do not depend on any specific sensor technology for measuring the distances identified. As previously noted, ultrasonic sensors may be used for spot measurement. LED or laser sensors could also be used for a spot measurement. With regard to scanning sensors a laser scanner may be used. Other scanning sensors could include a PMD camera or a LIDAR system.

It will be appreciated that the swelling of the concrete slab 16 in the area 16C may vary over a relatively short interval of time and thus it may be preferable to determine the height of the upper surface 18 in the area 16C as an average height over an interval of time so that adjustments are not made in response to short lived events. For example, an average height may be determined over a time interval in the range of from about 0 to about 240 seconds, optionally in a range of from about 10 to 180 seconds, still further optionally in a range of from about 10 to 60 seconds.

It will also be appreciated that the swelling of the concrete slab may be attributable to many different factors, some of which are relatively short term factors and some of which are relatively long term factors.

In the category of relatively short term factors, for example, there may be a load of concrete material dumped by a truck at location 16A which differs substantially from the previous material which had been supplied. The material supply typically is provided by a fleet of concrete mixer trucks bringing the material from a common source, but sometimes due to uncontrollable events, or a mistake or a delay in delivery, a load of concrete material may be dumped which is too wet or dry. Other short term events might include a change in the advance speed of the paving machine 10.

In the category of relatively long term factors, a change in inclination angle 84 will correspondingly change the angle of the bottom of the slip form mold 24. If the angle 84 is increased, thus raising the front edge of the mold 24 relative to the rear edge, this increases the amount of concrete "flowing" under the mold as the mold advances, thus increasing swelling at location 16C.

Similarly, if the gate 50 is raised this raises the height of the concrete in the area 16B just in front of the mold 24, which will also lead to an increase in swelling in the area 16C behind the mold.

Changes in swelling in the area 16C tend to occur rather slowly. The controller 202 may be configured to recognize certain likely patterns of change in the swelling and to predict a height of the formed not yet hardened concrete slab behind the slip form mold 24 in the area 16C based at least in part upon a rate of change of the swelling sensor signal from the swelling sensor 220.

It will be understood that in a typical paving operation the ultimate goal is consistency of the operation so that a favorable paving result can be set up and maintained throughout a paving job. Thus the "desired" swelling during a particular job may be to maintain a degree of swelling at a consistent level to that which exists when the paving machine is first set up for the job.

The controller 202 may also be configured to generate command signals to adjust various ones of the operating parameters automatically in response to measured or predicted swelling at location 16C, so as to correct for undesired swelling. The controller 202 may send a command signal to the advance drive of the paving machine 10 to increase or decrease the advance speed so as to reduce or increase, respectively, the swelling at area 16C. The controller 202 may send a command signal to the vibrators 56 to increase or decrease the vibrator speed so as to increase or reduce, respectively, the swelling at area 16C. The controller 202 may send a command signal to the gate actuator 52 to raise or lower the gate 50 to increase or reduce, respectively, the swelling at area 16C.

And as discussed above, the controller 202 may send command signals to the front and rear stringline sensor actuators 62F and 62R to increase or decrease the longitudinal inclination angle 84 to increase or reduce, respectively, the swelling at area 16C.

Because it may be difficult to determine what is the primary cause of an observed change in swelling, the controller 202 may be configured to adjust the various effective machine operating parameters in an order of the ease of implementation, or the speed of implementation. For example, the controller 202 may be configured to respond to an observed increase in swelling by adjusting the various machine parameters in the following order, to the extent that the selected parameter is not already at a maximum or minimum value:

1. Frequency or speed of vibration of vibrators 56;
2. Advance speed of the paving machine 10;
3. Height of the concrete supply gate 50; and
4. Longitudinal inclination 84 of the machine 10.

A method of operating the slip form paving machine 10 described above including the swelling sensor 220 may include steps of:

(a) monitoring with at least one swelling sensor 220 a swelling of the formed not yet hardened concrete slab 16 behind the slip form mold 24 and generating at least one sensor signal corresponding to the swelling;

(b) based at least in part on the at least one sensor signal, determining with the controller 202 a current or a predicted deviation of the swelling from a desired swelling and generating a corresponding command signal; and (c) in response to the command signal, automatically adjusting at least one operating parameter of the paving machine in a direction to counteract the deviation.

Step (a) may further include monitoring swelling of the formed not yet hardened concrete slab behind the slip form mold 24 as an average swelling over an interval of time.

Step (a) may further include monitoring the swelling of the formed not yet hardened concrete slab 16 behind the slip form mold 24 in at least two, and preferably at least three locations across the width 224 of the paving machine 10.

The at least one operating parameter adjusted in step (c) may include a travel speed of the paving machine 10, a vibrator speed or frequency of the vibrator 56 located in front of the slip form mold 24, a concrete supply gate 50 height in front of the slip form mold 24 or the longitudinal inclination 84 of the machine 10.

Step (c) may further include lowering the front end of the machine frame 22 relative to the rear end to decrease the swelling of the formed not yet hardened concrete slab 16 behind the slip form mold 24 in the area 16C, and raising the front end of the machine frame 22 relative to the rear end to increase the swelling of the formed not yet hardened concrete slab behind the slip form mold 24.

And when the paving machine 10 includes the oscillating beam 42, step (c) may further include adjusting the longitudinal inclination 84 of the machine frame 22 by adjusting both the front and rear lifting columns 32F and 32R and thereby tilting the machine frame 22 about a rotational axis 88 adjacent a rear edge of the oscillating beam 42 so that a height of the upper surface 18 of the formed not yet hardened concrete slab 16 behind the oscillating beam 42 is not changed. And step (c) may further include adjusting the longitudinal inclination 84 of the machine frame 22 by adjusting both the front and rear lifting columns 32F and 32R simultaneously.

When the paving machine 10 does not include an oscillating beam 42, step (c) may further include adjusting the longitudinal inclination 84 of the machine frame 22 by adjusting both the front and rear lifting columns 32F and 32R and thereby tilting the machine frame 22 about a rotational axis 90 adjacent a rear edge of the slip form mold 24 so that a height of the upper surface 18 of the formed not yet hardened concrete slab 16 behind the slip form mold 24 is not changed. And step (c) may further include adjusting the longitudinal inclination of the machine frame by adjusting both the front and rear lifting columns simultaneously.

The method may include after step (c) repeating steps (a) and (b) after a lag time interval sufficient to allow the adjusting of step (c) to result in a change in the swelling of the formed not yet hardened concrete slab 16 behind the slip form mold 24, and further adjusting the longitudinal inclination 84 of the machine frame 22 in a direction to counteract any further determined current or predicted deviation of the swelling of the formed not yet hardened concrete slab 16 behind the slip form mold 24. The lag time interval may be based on a time necessary for the paving machine 10 to travel a specified distance in the paving direction 12. For example, the lag time may be a time sufficient for the paving machine 10 to advance a distance in a range of from 0 to 20 m, optionally in a range of from about 0 to 10 m, and further optionally in a range of from about 1 to 10 m.

Roll Control

Another phenomenon encountered in slip form paving when using an oscillating beam such as the oscillating beam 42 is the formation of the "roll" 16D of not yet hardened concrete material immediately in front of the oscillating beam 42. The roll 16D tends to curl forward away from the oscillating beam and is generally in the form of a somewhat irregular shaped roughly cylindrical roll of not yet hardened concrete material. The material in the roll is in movement and the roll grows and shrinks in its cross-sectional size, and particularly in its height, depending on various operational parameters of the paving machine 10. Maintaining the roll 16D at an appropriate size is important to proper functioning of the oscillating beam 42.

One machine parameter which affects the size of the roll 16D is the longitudinal inclination 84 of the machine frame 22. Keep in mind that when using an oscillating beam 42 any changes in inclination are preferably made by rotating the machine frame about rotational axis 88 at the rear edge of the oscillating beam 42 so that the finish height of the upper surface 18 of the slab 16 is not changed. If the longitudinal inclination 84 is increased this will allow more concrete material to pass under the slip form mold 24 and build up ahead of the oscillating beam 42. Conversely, decreasing the angle of longitudinal inclination 84 will reduce the amount of concrete material passing under the advancing slip form mold 24 and thus reduce the size of the roll 16D.

The size of the roll 16D may be monitored with a roll size sensor 230 configured to detect a size of the roll 16D in front of the oscillating beam 42. The roll size sensor 230 may be configured to detect a parameter corresponding to a cross-sectional dimension of the roll 16D. It will be understood that the roll 16D is irregularly shaped and when a cross-sectional dimension such as height or width is discussed below, such a dimension is an irregular perhaps constantly changing dimension. A parameter "corresponding to" such a dimension need not be an exact quantitative measure of an actual dimension, but it is just somehow approximately representative of such a dimension.

In one embodiment schematically shown in FIG. 2 the roll size sensor 230 is a roll height sensor 230H and the parameter is a vertical distance 232 from the sensor 230H to a top of the roll 16D. Since the vertical distance from the sensor 230H to the bottom of the oscillating beam 42 is known, subtraction of the distance 232 gives the height 236 of roll 16D.

In a second embodiment also schematically shown in FIG. 2 the roll size sensor is a roll width sensor 230W and the parameter is a horizontal distance 234 from the sensor 230W to the side of the roll 16D. Since the horizontal distance from the sensor 230W to the front of the oscillating beam 42 is known, subtraction of the distance 234 gives the width 238 of the roll 16D.

In one embodiment as seen in FIG. 2 the roll size sensors 230H and 230W may each be a contactless distance sensor such as an ultrasonic sensor or a laser sensor. Although only a single roll size sensor 230H or 230W is shown in the schematic illustration, it will be understood that multiple roll size sensors 220 may be placed across the width 224 of the slip form paver machine 10 in a manner similar to that described with regard to FIG. 7A. Preferably each roll size sensor 230H or 230W includes at least two, and more preferably at least three, discrete sensors paced across the width 224 of the machine frame 22. The size and shape of the roll 16D may not be uniform across the width of the concrete slab and thus it may be desirable to make variable adjustments in operating parameters across the width of the concrete slab.

In another embodiment analogous to that of FIG. 7B for the swelling sensor, the roll size sensor 230H or 230W may include at least one scanning sensor, for example a laser scanner, configured to scan the height or width of the roll 16D across a continuous portion 222 of the width 224 of the machine frame 22. As noted above any suitable sensor technology may be used for the roll control sensors 230H or 230W.

The controller 202 may be configured to receive sensor signals from the roll size sensor 230H and/or 230W and to generate a command signal to one or both of the sensor actuators 60F and 60R to adjust the longitudinal inclination 84 of the machine 10.

If the paving machine 10 is configured to use a grade control system other than a stringline type grade control system, e.g. the satellite based system 300, 302, 304 or the Total Station type system 310, 302, 304, then in the absence of the sensor actuators 62 the controller 202 could send command signals directly to the hydraulic actuators 46F and 46R of the lifting columns 32F and 32R.

It will be appreciated that the exterior shape of the roll 16D may be somewhat irregular and thus it may be preferable for the controller 202 to be configured to determine the height or width of the roll 16D as an average height or width over an interval of time so that adjustments are not made in response to short lived events. For example, an average height or width may be determined over a time interval in the range of from about 0 to 20 minutes; optionally in a range of from about 0 to 10 minutes; and further optionally in a range of from about 1 to 10 minutes.

The controller 202 may further be configured to predict the size of the roll 16D based at least in part upon a rate of change of the sensor signals from the roll size sensors 230H and/or 230W.

The controller 202 may further be configured to lower the front end of the machine frame 22 to decrease the size of the roll 16D and to raise the front end of the machine frame 22 relative to the rear end to increase the size of the roll 16D.

The controller 202 may be further configured to adjust the longitudinal inclination 84 of the machine frame 22 by adjusting both the front and rear lifting columns 32F and 32R simultaneously thereby tilting the machine frame 22 about the rotational axis 88 adjacent the rear edge of the oscillating beam 42 so that the height of the upper surface 18 of the formed not yet hardened concrete slab 16 behind the oscillating beam 42 is not changed.

For any given paving machine 10 and set of operating parameters of the machine and the concrete material, a desired size of the roll 16D will typically be known, sometimes as a range of sizes. The controller may be configured to: (a) monitor the sensor signals from the roll size sensors 230H and/or 230W; (b) based at least in part on the sensor signals determine a current or a predicted deviation of the size of the roll 16D from the desired size; and (c) generate a command signal to adjust the longitudinal inclination of the machine frame in a direction to counteract the deviation.

After step (c) the controller 202 may repeat steps (a) and (b) after a lag time interval sufficient to allow the adjusting of step (c) to result in a change in the size of the roll 16D. Then the controller 202 may further adjust the longitudinal inclination of the machine frame 22 in a direction to counteract any further determined current or predicted deviation of the size of the roll 16D. The lag time interval may be based on a time necessary for the paving machine 10 to travel a specified distance in the paving direction.

Other machine operating parameters, other than the longitudinal inclination 84, may affect the size of the roll 16D. One such other operating parameter is the height of the mass of concrete material in front of the slip form mold 24 in the area 16B. This height may be detected by a concrete supply height sensor 240. Like the swelling sensor 220 and the roll height sensor 230H, the concrete supply height sensor 240 may be either an ultrasonic sensor, preferably at least two and more preferably at least three such sensors across the width of the slab 16, or a scanning sensor such as a laser scanner.

Another such operating parameter is the slab swelling in the area 16C as detected by the swelling sensor 220.

The controller 202 may monitor the signals from the concrete supply height sensor 240 and/or the swelling sensor 220 and generate its command signal to adjust the longitudinal inclination 84 at least in part on those signals and predicted impacts of those parameters on the roll size.

Measuring Paving Thickness

The paving machine 10 may be further configured to allow monitoring and/or control of the thickness of the paved slab 16. To this end the paving machine 10 may include front and rear height sensors 102 and 104.

The front height sensor 102 may be configured to detect a distance 108 relative to the machine frame 22 from the ground surface 14 ahead of the concrete slab 16, and to generate a front height signal. The front height sensor 102 may be arranged forward of the front lifting columns 32F, but it may be at any suitable location above the ground surface 14 ahead of the expected placement of the mass of unformed concrete material 16A.

The rear height sensor 104 may be configured to detect a distance 110 relative to the machine frame 22 from the upper surface 18 of the formed concrete slab 16 and to generate a rear height signal. The rear height sensor 104 may be arranged rearward of the rear lifting columns 32R, but it may be at any suitable location behind the oscillating beam 42.

The controller 202 may be configured to receive the front and rear height signals from front and rear height sensors 102 and 104 and to determine a thickness 106 of the concrete slab 16 based at least in part on the front and rear height signals.

The front and/or rear height sensors 102 and/or 104 may each be an ultrasonic sensor. Preferably each such front and/or rear height sensor includes at least two, and more preferably at least three, discrete ultrasonic sensors spaced across the width 224 of slab 16 in a manner analogous to that shown in FIG. 7A for the swelling sensors.

In another embodiment the front and/or rear height sensors 102 and 104 may each include at least one scanning sensor, for example a scanning laser sensor, configured to scan the ground surface 14 and/or the slab surface 18 across a continuous portion 222 of the width 224 of the slab analogous to that shown in FIG. 7B for the swelling sensors. The at least one scanning sensor may include two or more scanning sensors scanning different or overlapping continuous portions of the width 224 of the slab.

To determine the thickness 106 of the slab 16 at any given location on the ground surface 14 the controller 202 may be configured to compare the front height signal corresponding to the given location on the ground surface 14 to a later occurring rear height signal corresponding to substantially the same given location on the ground surface. This may be accomplished in various ways.

In one aspect the controller 202 may be configured to correlate the front and rear height signals based upon the machine 10 traveling a horizontal distance substantially equal to a horizontal spacing 108 between the front and rear height sensors 102 and 104.

In another aspect the controller 202 may be configured to store data corresponding to the height signals in the computer memory 206 and correlate the data to a location of the machine 10 upon the ground surface 14. If the machine 10 is using a stringline grade control system like one of those schematically shown in FIGS. 3 and 4 this correlation may be performed by associating each height signal with a distance the machine 10 has traveled along the stringline 58 from a starting location. This distance sensing may be done by a pick-up or sensor in the track drives to determine the traveled distance of the paver along the track.

If the machine 10 is using a three-dimensional grade control system based upon a position of the machine 10 in a reference system external to the machine 10, such as is the case when using a satellite based grade control system 300, 302, 304 or a Total station type grade control system 310, 302, 304, the controller 202 may be configured to correlate the height data to the position of the machine 10 in the reference system external to the machine 10. For example, the controller 202 may be configured to correlate the height data to the position of the machine 10 according to GPS or GNSS satellite system coordinates.

For any of the above techniques, when the present disclosure refers to "substantially" the same location, or to a distance "substantially" equal to the horizontal spacing between sensors, it will be understood that the location or the distance need not be exactly the same. For one thing, depending upon the particular type of sensors used, the location on the ground surface or on the upper surface of the slab which is seen by the sensor is not a mathematical point, but instead is an area. It will also be understood that any sensor such as 102 or 104 will have a focal point in the center of that area, or for a scanning sensor as shown in FIG. 7B there will be a focal line across the width of the slab. Furthermore, given the expected general uniformity of the ground surface and of the upper surface 18 of the slab 16, some variation in the focal point of the front and rear sensors 102 and 104 may be permitted without adversely affecting the comparison to determine the thickness 106 of the slab. Thus, as used in the present disclosure, the phrase "substantially the same location" shall be understood to include a focal point or focal line of the rear sensor 104 that is within 30 cm of the focal point or focal line of the front sensor 102. Similarly, a distance "substantially" equal to the horizontal spacing between sensors 102 and 104 will be understood to include any distance that is within plus or minus 30 cm of the horizontal spacing between the focal points of the front and rear sensors.

The controller 202 may be further configured to determine the total volume of a concrete slab 16 formed during a paving operation and optionally to generate reports of the same. This volume can be determined by integrating the thickness 106 of the concrete slab over the area of the slab as determined by its length in the paving direction 12 and its width 224. Such a a report may for example be used for billing purposes and to show performance of contract specifications. Such reports may also be representative of other performance parameters, such as minimum thickness, maximum thickness, or to otherwise document the paving thickness 106 as a function of geographic location on the slab 16.

Additionally, the controller 202 may be configured to control the paving thickness 106. The controller 202 may be configured to send command signals to the lifting columns 32F and 32R, or to the front and rear sensor actuators 62F and 62R, to automatically adjust the height of the machine frame relative to the ground surface 14 and thereby control the thickness of the concrete slab 16 based at least in part on a comparison of a determined thickness 106 of the slab 16 to a desired thickness of the slab at a given geographic location. In either case the command signals cause the lifting columns to adjust the height of the machine frame relative to the ground surface to control the thickness of the concrete slab.

Such a method may be described as including steps of:

detecting a distance 108 relative to the machine frame 22 from the ground surface 14 with a front height sensor 102 ahead of the concrete slab 16 and generating a front height signal;

detecting a distance 110 relative to the machine frame 22 from an upper surface 18 of the concrete slab 16 with a rear height sensor 104 and generating a rear height signal; and determining with a controller 202 a thickness 106 of the concrete slab 16 based at least in part on the front and rear height signals.

The determining step may include comparing a front height signal corresponding to a given location on the ground surface 14 to a later occurring rear height signal corresponding to substantially the same given location on the ground surface. As described above this may be done by correlating the front and rear height signals based upon the machine 10 traveling a horizontal distance substantially equal to horizontal spacing 108 between the front and rear height signals.

The method may further include storing data corresponding to the height signals in the computer memory 206 and correlating the data to a location of the machine 10 upon the ground surface 14.

The method may further include a step of automatically generating with the controller 202 a report representative of a total volume of the concrete slab 16 formed during a paving operation.

The method may further include steps of:

comparing with the controller 202 the determined thickness 106 of the concrete slab 16 to a desired thickness of the concrete slab; and sending command signals from the controller 202 to the lifting columns 32F and 32R, or to the front and rear sensor actuators 62F and 62R, to automatically adjust the height of the machine frame 22 relative to the ground surface 14 and thereby control the thickness 106 of the concrete slab 16 based at least in part on the comparing.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A slip form paving machine, comprising:

a machine frame;

a plurality of ground engaging wheels or tracks, including at least one left side wheel or track and at least one right side wheel or track;

front and rear height adjustable lifting columns supporting the machine frame from the ground engaging wheels or tracks, the lifting columns being adjustable to adjust a height of the machine frame relative to a ground surface;

an inset slip form mold supported from the machine frame between the at least one left side wheel or track and the at least one right side wheel or track for molding a mass of concrete into a formed not yet hardened concrete slab between the at least one left side wheel or track and the at least one right side wheel or track as the paving machine moves forward in a paving direction;

a front height sensor configured to detect a distance of the machine frame from the ground surface ahead of the concrete slab and generate a front height signal;

a rear height sensor configured to detect a distance of the machine frame from an upper surface of the concrete slab and generate a rear height signal; and a controller configured to receive the front and rear height signals and to determine a thickness of the concrete slab based at least in part on the front and rear height signals.

2. The machine of claim 1, wherein:

the front height sensor is arranged forward of the front lifting columns; and the rear height sensor is arranged rearward of the rear lifting columns.

3. The machine of claim 1, wherein:

the front and rear height sensors are ultrasonic sensors.

4. The machine of claim 3, wherein:

each of the front and rear height sensors includes at least two discrete ultrasonic sensors spaced across a width of the machine frame.

5. The machine of claim 1, wherein:

the front height sensor includes at least one front scanning laser sensor configured to scan the ground surface across a continuous portion of the width of the machine frame; and the rear height sensor includes at least one rear scanning laser sensor configured to scan the upper surface of the concrete slab across a continuous portion of the width of the machine frame.

6. The machine of claim 1, wherein:

the controller is configured to compare a front height signal corresponding to a given location on the ground surface to a later occurring rear height signal corresponding to substantially the same given location on the ground surface.

7. The machine of claim 1, wherein:

the controller is configured to correlate the front and rear height signals based upon the machine traveling a horizontal distance substantially equal to a horizontal spacing between the front and rear height sensors.

8. The machine of claim 1, wherein:

the controller is configured to store data corresponding to the height signals in a computer memory and correlate the data to a location of the machine upon the ground surface.

9. A slip form paving machine, comprising:

a machine frame;

a plurality of ground engaging wheels or tracks;

front and rear height adjustable lifting columns supporting the machine frame from the ground engaging wheels or tracks, the lifting columns being adjustable to adjust a height of the machine frame relative to a ground surface;

a slip form mold supported from the machine frame for molding a mass of concrete into a formed not yet hardened concrete structure as the paving machine moves forward in a paving direction;

a front height sensor configured to detect a distance of the machine frame from the ground surface ahead of the concrete structure and generate a front height signal;

a rear height sensor configured to detect a distance of the machine frame from an upper surface of the concrete structure and generate a rear height signal; and a controller configured to receive the front and rear height signals and to determine a thickness of the concrete structure based at least in part on the front and rear height signals;

wherein the controller is configured to store data corresponding to the height signals in a computer memory and correlate the data to a location of the machine upon the ground surface;

wherein the machine includes a string line grade control system; and wherein the controller is configured to correlate the data to a distance traveled by the machine from a starting location.

10. A slip form paving machine, comprising:

a machine frame;

a plurality of ground engaging wheels or tracks;

front and rear height adjustable lifting columns supporting the machine frame from the ground engaging wheels or tracks, the lifting columns being adjustable to adjust a height of the machine frame relative to a ground surface;

a slip form mold supported from the machine frame for molding a mass of concrete into a formed not yet hardened concrete structure as the paving machine moves forward in a paving direction;

a front height sensor configured to detect a distance of the machine frame from the ground surface ahead of the concrete structure and generate a front height signal;

a rear height sensor configured to detect a distance of the machine frame from an upper surface of the concrete structure and generate a rear height signal; and a controller configured to receive the front and rear height signals and to determine a thickness of the concrete structure based at least in part on the front and rear height signals;

wherein the controller is configured to store data corresponding to the height signals in a computer memory and correlate the data to a location of the machine upon the ground surface;

wherein the machine includes a three-dimensional grade control system based upon a position of the machine in a reference system external to the machine; and wherein the controller is configured to correlate the data to the position of the machine in the reference system external to the machine.

11. The machine of claim 10, wherein:

the three-dimensional grade control system includes a satellite based system.

12. The machine of claim 10, wherein:

the three-dimensional grade control system includes a Total station based system.

13. The machine of claim 8, wherein:

the controller is configured to determine a total volume of the concrete slab formed during a selected time interval.

14. The machine of claim 10, wherein:

the controller is configured to send command signals to cause the lifting columns to automatically adjust the height of the machine frame relative to the ground surface and thereby control the thickness of the concrete structure slab based at least in part on a comparison of the determined thickness of the concrete structure slab to a desired thickness of the concrete structure slab.

15. A method of operating a slip form paving machine, the machine including:

a machine frame having a front end and a rear end;

a plurality of ground engaging wheels or tracks, including at least one left side wheel or track and at least one right side wheel or track;

front and rear height adjustable lifting columns supporting the machine frame from the ground engaging wheels or tracks, the lifting columns being adjustable to adjust a height of the machine frame relative to a ground surface; and an inset slip form mold supported from the machine frame between the at least one left side wheel or track and the at least one right side wheel or track for molding a mass of concrete into a formed not yet hardened concrete slab between the at least one left side wheel or track and the at least one right side wheel or track as the paving machine moves forward in a paving direction;

the method comprising:

detecting a distance relative to the machine frame from the ground surface with a front height sensor ahead of the concrete slab and generating a front height signal;

detecting a distance relative to the machine frame from an upper surface of the concrete slab with a rear height sensor and generating a rear height signal; and determining with a controller a thickness of the concrete slab based at least in part on the front and rear height signals.

16. The method of claim 15, further wherein:

the determining includes comparing a front height signal corresponding to a given location on the ground surface to a later occurring rear height signal corresponding to substantially the same given location on the ground surface.

17. The method of claim 15, wherein:

the determining includes correlating the front and rear height signals based upon the machine traveling a horizontal distance substantially equal to a horizontal spacing between the front and rear height sensors.

18. The method of claim 15, further comprising:

storing data corresponding to the height signals in a computer memory and correlating the data to a location of the machine upon the ground surface.

19. The method of claim 15, further comprising:

automatically determining with the controller a total volume of the concrete slab formed during a paving operation.

20. The method of claim 15, further comprising:

comparing with the controller the determined thickness of the concrete slab to a desired thickness of the concrete slab; and sending command signals from the controller to cause the lifting columns to automatically adjust the height of the machine frame relative to the ground surface and thereby control the thickness of the concrete slab based at least in part on the comparing.

* * * * *